3,539,535
CATIONIC CARBAMOYL POLYMERS
Ralph L. Wisner, Midland, Mich., assignor to The Dow Chemical Company, Midland, Mich., a corporation of Delaware
No Drawing. Continuation-in-part of application Ser. No. 498,094, Nov. 19, 1965. This application Nov. 4, 1968, Ser. No. 773,318
Int. Cl. C08g 9/04, 9/20, 9/24
U.S. Cl. 260—72                          9 Claims

ABSTRACT OF THE DISCLOSURE

Cationic Mannich derivatives of carbamoyl group containing polymers are obtained by reacting concentrated aqueous sols of the polymers in an organic dispersing medium with formaldehyde and siutable amines. Solid, water-soluble products obtained in this manner have a low proportion of insolubles. The solid products also have superior storage stability, as compared to similar derivatives obtained by the simple solution reaction of the prior art.

CROSS-REFERENCE TO RELATED APPLICATION

This applicatiton is a continuation-in-part of copending application, Ser. No. 498,094, filed Oct. 19, 1965, now abandoned.

SUMMARY OF THE INVENTION

The present invention concerns a process for preparing certain water-soluble polymers. More particularly, the process involves a novel suspension reactioin technique to produce water-soluble, cationic carbamoyl polymers in the form of particulate solids.

It is known that carbamoyl polymers, such as polyacrylamides can be modified by reaction with formaldehyde and amines to produce cationic polymers. The reaction is sometimes referred to as the Mannich reaction. One application of this reaction to polyacrylamides is taught by Sven and Schiller in Industrial Engineering Chemistry, vol. 49 (1956), page 2132. Another application of the reaction to polymeric amides is taught by Grimm et al. in U.S. Pat. 2,328,901.

It is characteristic of the known techniques that the carbamoyl polymers are reacted in dilute aqueous solution, e.g. 5–10 percent, by weight polymer solutions. With more concentrated solutions, there is a tendency for the system to produce cross-linked gels. Also more concentrated polymer solutions are highly viscous and as a result difficult to work with.

If desired, the modified carbamoyl polymers prepared in dilute aqueous solution can be recovered from the reaction system as solid products. However, due to the relatively small amount of polymer in relation to the water present in the system, such a recovery step adds considerable expense to the overall process. Moreover, when the cationic reaction products of the carbamoyl polymers are recovered from dilute water solution, experience has shown them to be unstable, That is, the recovered solid products tend to undergo further reaction during storage with resulting cross-linking and consequent partial water insolubilization. Often such solid polymers undergo so much cross-linking as to render the product practically useless for many applications. It is considered that polymers which develop in excess of 5 volume percent insoluble gels upon dispersion in water are too insoluble.

For purposes herein, the volume fraction or percent insolubles is determined by preparing a 0.5 percent by weight solution of the polymer to be evaluated in a 4 weight percent sodium chloride solution in water. After shaking the polymer dispersion for two hours, it is centrifuged to effect settling of any disperse phase. The insolubles, which usually appear as distinct gels in the aqueous dispersion are then measured as a fraction or percentage of the total solution volume.

Insolubles, as described above, interfere with the performance of the product as a flocculant and seriously detract from its usefulness on an active solids basis. One instance wherein this interference becomes readily evident is in the use of the cationic carbamoyl polymers as drainage aids in the manufacture of paper. The insolubles or polymer gels appear as discontinuities in the finished paper.

Manifestly, the convenience of handling and transporting solid polymeric products as contrasted with dilute aqueous solutions thereof renders the solid form of the modified carbamoyl polymer highly desirable. Storage stability of such materials is an essential prerequisite of their practical application.

The preparation of solid, water-soluble cationic carbamoyl polymers with good solid state stability are central objectives of the present invention. Further objectives are to provide a novel process for the Mannich modification of water-soluble carbamoyl polymers to render them cationic and, in carrying out such a process, to achieve a rapid reaction and high yields of the desired product based on reaction materials. The process of the present invention also enables highly efficient recovery of reacted solids from an aqueuos reaction medium, as compared to recovery techniques applicable to the dilute polymer solutions of the prior art.

The above objectives and other benefits as will become apparent hereinafter, are accomplished in accordance with the present invention. In process terms, this invention comprises the novel of forming a suspension of beads of a concentrated aqueous solution of a water-soluable, carbamoyl polymer in a water- immiscible, inert liquid. By carbamoyl polymers is meant a polymer having at least about 20 mole percent of its mers substituted with carbamoyl groups. The concentrated aqueous solution of the carbamoyl polymer will contain from about 30 to 80 percent, preferably 50 to 75 percent, by weight polymer solids. The polymer beads or suspended aqueous phase, i.e. polymer solution, will constitute from about 1 to about 70 percent by weight, preferably 15 to 50 percent by weight, of the total suspension. In any event the suspension exists as a liquid and can be stirred and otherwise physically handled as required throughout the reaction. Inert solvents used herein can be any water-immiscible organic liquid which neither dissolves the polymer nor reacts with the polymer or other reactants as hereinafter specified. Convenient solvents include the saturated liquid aliphatic and aromatic hydrocarbons.

Having formed the suspension of aqueous polymer beads, formaldehyde and a water-soluable mono-functional, secondary amine are incorporated therein to react with the carbamoyl groups on the polymer. The formaldehyde and amine may be simultaneously added to the suspension, or they may be pre-reacted or pre-mixed, and the resulting product incorporated into the suspension. Alternately, as is preferred, the amine is first added and this is followed by the formaldehyde.

Essentially equal molar proportions of formaldehyde and the amine are reacted with the polymer to convert a plurality of carbamoyl groups to cationic, substituted amides. Preferably, from about 1 to about 1.1 moles of the amine are used for each mole of formaldehyde and enough of these reactants are charged to the suspension to convert at least about 1 mole percent of the carbamoyl mers constituting the polymer to cationic mers. Preferably, the conversion to cationic mers does not exceed about 50 mole percent of the mers constituting the polymer. Above this level, the polymer is likely to cross-link. In other terms, the molar ratio of reactants, i.e., moles of amine/moles of formaldehyde/moles of carbamoyl group contained in the polymer, is usually maintained within the range of (0.01/0.01/1) to (1/1/1). Usually the reaction is not continued beyond conversion of about 50 mer mole percent of the polymer to cationic amides. Thus, with homopolymers of carbamoyl monomers, the above reactant molar ratio is usually within the range from (0.01/0.01/1) to (0.5/0.5/1).

During the reaction, the suspension is maintained at a temperature from about 20 to about 70° C. Preferably it is maintained within the range from about 30 to about 50° C. The reaction time required to achieve significant conversion of amide groups to cationic moieties will decrease as the temperature is increased. Effective reaction of the charged materials normally occurs within 30 to 60 minutes at intermediate reaction temperatures. The reaction time, however, may be as much as several hours at lower reaction temperatures. Efficient conversion of the reactants is usually achieved at reaction times ranging from about 0.25 up to about 1.5 hours. In any event, the reaction is continued for a period of time sufficient to impart cationic activity to the polymer and is terminated prior to the onset of the formation of significant insolubles, i.e. cross-linked polymer, in isolated product.

Although it is not necessary for the production of effectively soluable and stable cationic carbamoyl polymers, it is desirable, after allowing the reaction to proceed for at least about 30 minutes, and prior to the termination thereof, to incorporate an additional amount of a water-soluable, secondary amine into the reaction system. The amount of additional amine is usually from about 5 up to 100 percent by weight of the initial amine charge. This amine reacts with, and thereby inactivates potential cross-linking sites on the polymer. In this manner, the storage stability of the finished polymer is further improved.

Upon completion of the reaction, the modified carbamoyl polymer is separated from the reaction system as a solid product in any convenient manner. Preferably, techniques employed to accomplish the separation do not utilize temperatures above about 80° C. One method of accomplishing the separation involves treating the suspended aqueous polymer beads with a water-absorptive solvent such as acetone, dioxane or tetrahydrofuran. Alternately, the reaction system can be distilled under reduced pressures, preferably at temperatures not exceeding about 70° C.

In distillation operations, it is desirable to incorporate a formaldehyde scavenger into the reaction system. Examples of high boiling amines suitable for use as such scavengers include methylaminoethanol and diethanolamine. Inorganic formaldehyde scavengers such as alkali metal bisulfites can also be used effectively. The polymeric products as recovered should contain less than about 10 percent, preferably less than 5 percent, by weight of water. Lower water contents favor storage stability in the finished solid product.

The secondary amine used can be characterized according to the formula:

wherein $R_2$ and $R_3$ are each independently selected from alkyl and hydroxyalkyl groups having from 1 to 5 carbons, with the total carbons of the amine not exceeding 8. $R_2$ and $R_3$, taken together, are a residue of a hydrophilic, N-heterocyclic amine.

Particular secondary amines include dimethyl amine, methyl ethyl amine, amyl methyl amine and dibutyl amine. Other amines include piperidine, morpholine, ethanol methyl amine and diethanol amine. In general, any water-soluble compound containing a secondary amino group with an available hydrogen can be reacted in the manner of the present invention with water-soluble carbamoyl polymers to provide polymers with cationic substituted amide groups.

The carbamoyl polymer employed herein can be characterized as a water-soluble polymer of preponderantly monoethylenically unsaturated monomers of which at least about 20 mole percent have a plurality of carbamoyl groups according to the formula:

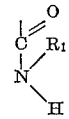

wherein $R_1$ is independently selected from the group of hydrogen and alkyl hydrocarbons with 1 to 4 carbons. The polymer is further characterized as containing sufficient hydrophilic moieties to produce a water-soluble polymer.

Specific carbamoyl polymers include the various water-soluble homopolymer sand copolymers of acrylamide and methacrylamide. Others are the various water-soluble copolymers of N-substituted acrylamides such as N-methyl-acrylamide and N-propylacrylamide. Still other carbamoyl polymers are prepared from the amides and half amides of maleic and fumaric acids. In general any monoethylenically unsaturated and polymerizable monomer, which contains a carbamoyl group, may be employed in the preparation of the carbamoyl polymers. The balance of comonomers used to prepare the copolymers may be in the form of any water-soluble, or water-insoluble, monoethylenically unsaturated monomers copolymerizable with a carbamoyl monomer, so long as, in the instance of water-insoluble comonomers the total amount of water-soluble monomers used is sufficient to impart water solubility to the finished copolymer. The amount of anionic monomer should be controlled to avoid producing a polymer which coacervates upon conversion of the amide groups to cationic moieties. Generally, coacervation will be avoided by keeping the amount of anionic mer below about 15 mole percent of the starting polymer.

In addition to the substantially linear polymers and copolymers obtained by polymerization of monoethylenically unsaturated monomers as set forth above, branched carbamoyl polymers may also be employed in accordance with the present invention. Such branched polymers are obtained by copolymerizing a preponderance of monoethylenically unsaturated monomer or monomers with a small, carefully controlled proportion of a monomer containing two sites of ethylenic unsaturation in the same molecule. Typical monomers having two such sites are N, N'-alkylene- or alkylidene-bis-acrylamides and methacrylamides such as N,N'-methylene-bisacrylamide, alkylene bis-esters of unsaturated organic acids such as ethylene-bis-acrylate, divinylaromatic compounds such as divinylbenzene, unsaturated aliphatic esters of unsaturated acids, such as allyl methacrylate, and other diene compounds such as diallyl ether, butadiene and the like. For such use, monomers having appreciable solubility in water, for example methylene-bis-acrylamide, are preferred. In the preparation of the branched, water-soluble, carbamoyl polymers it is critical and essential that the proportion of the diethylenically unsaturated monomer be maintained at a very low value in order to avoid the formation of cross-linked, water-insoluble polymers. In general not more than 60 parts, preferably from about 5 to about 25 parts, by weight of diethylenically unsaturated monomer can be employed with each million parts by weight of monoethylenically unsaturated monomer to be polymerized.

Preferred comonomers include those of the formula:

wherein $R_4$ is hydrogen or methyl and Y is a carboxylate or carboxamide or esterified hydroxyl group. Examples of such comonomers include alkanoic esters of vinyl alcohol and alkali metal salts of acrylic and methacrylic acids such as sodium and potassium acrylates and methacrylates.

Still other suitable comonomers include the alkali metal styrene sulfonates, alkali metal maleates, and N-vinyl oxazolidinone, N-vinylpyrrolidone, 2-aminoethyl acrylate and trimethyl vinylbenzyl quaternary ammonium chloride. Some water-insoluble monomers may also be used. Water-insoluble, or essentially water-insoluble monomers, sometimes copolymerized with carbamoyl monomers described herein include acrylonitrile, methacrylonitrile, ethyl acrylate, vinyl acetate, vinylmethyl ether and styrene.

The preferred solid polymeric products of the foregoing process can be characterized as water-soluble, linear or branched polymers corresponding to interpolymers of (a) from about 1 up to 50 mole percent of a substituted amide having the formula:

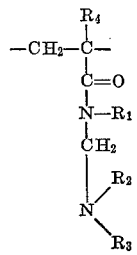

wherein $R_1$ is hydrogen or an alkyl group with up to 4 carbons and $R_2$ and $R_3$ are each independently selected from the group of alkyls and hydroxyalkyls having from 1 to 5 carbons and $R_2$ and $R_3$ taken together, are the residue of a water-soluble, N-heterocyclic secondary amine, and $R_4$ is hydrogen or methyl and (b) from about 99 to about 50 mole percent of at least one monoethylenically unsaturated comonomer copolymerizable with the above substituted amide. The preferred polymer is further characterized in that it contains no more than about 15 mole percent of interpolymerized anionic mers.

The parameters of the present invention are further illustrated in the following examples.

EXAMPLE 1

A series of experiments were carried out under the invention to illustrate the general advantages of carrying out a Mannich reaction on a suspended polymer phase and particularly the important effects of polymer concentration in the aqueous phase and reaction time as reaction variables. The general procedure involved suspending 15 grams of a polyacrylamide in 100 milliliters of xylene. The polymer was characterized by a molecular weight of about 3 million and about 2 percent of the original carboxamide groups had been hydrolyzed to carboxylate groups. To the suspension was added a small amount of water. The suspension was then placed in a reciprocating shaker for about 2 hours to facilitate absorption of the water by the polymer in suspension thereby forming a suspension of aqueous polymer beads.

Subsequently, 10 milliliters of dimethylamino-methanol was added to the xylene suspension of the polymer solution. This reagent was prepared as the mass reaction product of equimolar amounts of dimethylamine and paraformaldehyde. The reaction system was then agitated on the reciprocating shaker for 1 hour at ambient room temperature.

The polymer was dried in situ by extraction of the reaction system with several volumes of acetone. Dried polymer was then recovered from the solvent system by filtration.

The results of these experiments, along with the reaction variables, are tabulated below. Reaction conditions specified include the amounts of water of polymer concentrations, and reaction times used. The percent Mannich product column refers to the weight percent of cationic or substituted carboxamide mers in the finished product. The volume percent insolubles in the isolated product was determined as previously described.

TABLE I

| Run No. | Added water (ml.) | Polymer conc. Wt. Percent | Reaction time (Hrs.) | Wt. Percent Mannich product | Vol. Percent insolubles |
|---|---|---|---|---|---|
| 1 | 5 | 75 | 0.5 | 30 | 1.0 |
| 2 | 5 | 75 | 1 | 38 | 1.5 |
| 3 | 5 | 75 | 2 | 44 | 2.0 |
| 4 | 5 | 75 | 3 | 45 | 1.2 |
| 5 | 15 | 50 | 0.5 | 39 | 0.6 |
| 6 | 15 | 50 | 1 | 43 | 0.2 |
| 7 | 15 | 50 | 2 | 47 | 3.2 |
| 8 | 15 | 50 | 3 | 45 | 9.0 |
| 9 | 31 | 33 | 0.5 | 35 | 0.6 |
| 10 | 31 | 33 | 1 | 41 | 7.0 |
| 11 | 31 | 33 | 2 | 41 | 10.0 |
| 12 | 31 | 33 | 3 | 40 | 15.0 |

From the foregoing data, it is evident that the conversion increases with reaction time and the rate of the aminomethylation reaction was faster with the 50 percent polymer solution.

To lessen the proportion of the insolubles observed with the reaction series using 33 and 50 percent of polymer solutions one can reduce the molecular weight of the starting polymer or run the aminomethylation for shorter periods of time. With polymer solutions above about 80 percent polymer solids, there is a large drop in reaction efficiency in terms of yields and total conversion of carbamoyl groups to the desired cationic groups.

EXAMPLE 2

In this example the amine and formaldehyde were separately incorporated into the reaction system, with the formaldehyde being added last. About 200 grams of a polyacrylamide having a molecular weight of about 2.7 million and 130 grams of water were mixed and suspended in 250 milliliters of xylene contained in a 0.5 liter reaction vessel. The vessel was equipped with a stirrer, dropping funnel, thermometer and condenser. To the suspension was added 45 grams of dimethyl amine. Subsequently 30 grams of paraformaldehyde was added as a suspension in 100 milliliters of xylene. Upon the addition of the paraformaldehyde, the temperature of the reaction system rose from about 30° to 35° C. It was maintained at 35° C. by periodically cooling the reaction vessel. After 1.5 hours, 25 grams of additional dimethyl amine was added and the mixture stirred for 2 hours.

The reaction mass was then divided into several aliquots, one of which was subjected to solvent extraction with acetone, as previously described in Example 1, to recover a substantially dry particulate polymer. The other aliquot was dried by azeotropic distillation at about 50° C. under a vacuum of 100 millimeters of mercury. To accomplish the distillation separation, methylaminoethanol was added to the system as a stabilizer. Both of these dried product were substantially soluble in water, i.e. having insoluble contents of less than 0.2 volume percent. The reaction yields based on paraformaldehyde were greater than 95 percent. Omission of the alkanol amine in the distillation of another aliquot of the reaction system resulted in a product containing 8 volume percent insolubles.

EXAMPLE 3

A series of experiments was carried out to prepare modified polyacrylamides in accordance with the invention using a number of different monofunctional, water-soluble secondary amines. The general procedure involved suspending the polymer in xylene, swelling the polymer with about 25 percent by weight water, based on the weight of the polymer, and reacting the resulting aqueous polymer beads with an equimolar mixture of paraformaldehyde and the particular secondary amine used. Enough of the amine and formaldehyde was incorporated into this system to theoretically convert about 25 percent of the available amide groups to cationic groups. The secondary amines used, degree of reaction, as represented by the percent by weight Mannich product, and the solubility characteristics of the resulting polymer are listed below:

TABLE II

| | Secondary amine | Wt. percent Mannich product | Vol. percent insolubles |
|---|---|---|---|
| Compound: | | | |
| A | Piperidine | 4.0 | <0.2 |
| B | Methylaminoethanol | 29.5 | <0.2 |
| C | Diethanolamine | 20 | 2.5 |
| D | Morpholine | 5.3 | 0.2 |

EXAMPLE 4

This example illustrates the comparative ease with which modified polymer prepared by the invention can be dried by solvent extraction of the reaction system. A reaction system containing an aqueous suspension of Mannich modified carbamoyl polymer was extracted with acetone and the system filtered to recover a solid polymer product. The aqueous polymer phase initially contained 40 percent by weight water. The amount of acetone necessary to accomplish the drying of this product to provide a granular, free flowing powder was 6 pounds per pound of polymeric product.

By way of comparison, similar reaction products in dilute water solutions containing only 5, 3 and 1 weight percent modified polymer solids required anywhere from 170 to 350 pounds of acetone to produce one pound of dry, free flowing polymer solids.

EXAMPLE 5

The solid state stability of Mannich modified carbamoyl polymers prepared according to the invention is superior to products that have been prepared in dilute aqueous solution. To illustrate this aspect of the invention, polymers prepared using the suspension reaction technique were compared with polymers prepared in and recovered as solid products from dilute aqueous solutions. Each type of polymer had been contacted with equal molar amounts of dimethylamine and paraformaldehyde. Enough of these reactants were used to theoretically react with about 40 mole percent of the available carboxamide groups. The suspension reactions were carried out in xylene, the suspended phase being a 60 percent polyacrylamide solution in water. The dilute aqueous solution reactions were carried out in 1, 3 and 5 weight percent polymer solutions in water. The polymers were recovered as solid products by acetone extraction of their respective reaction systems.

A polymer is stable for purposes herein if it maintains an essentially level volume percent of insolubles for at least 30 days at 25° C. after initial recovery from the reaction system.

Solid state stability testing involved determining the percent insolubles in the product as initially recovered and again after intervals of storage at 3 and 30 days at ambient room temperature of about 25° C. The results of these experiments are set forth in the following table. The data shows the suspension reaction products to be stable and those prepared in dilute solution to be unstable.

TABLE III

| Preparative process | | Initial | Vol. percent insolubles after— | |
|---|---|---|---|---|
| | | | 3 days | 30 days |
| Polymer: | | | | |
| A | Suspension (60% polymer in H₂O) | <0.2 | <0.2 | <0.2 |
| B | do | <0.2 | <0.2 | <0.2 |
| C | 1% polymer in H₂O | 0.2 | 5.0 | |
| D | 3% polymer in H₂O | <0.2 | 5.0 | |
| E | 5% polymer in H₂O | 10.0 | 10.0 | |

It is a further aspect of the invention that the incorporation into the suspension reaction system of an excess of the amine after about 30 minute of reaction time significantly enhances the period of product stability in the solid state. The amount of amine so used can vary up to as much as 100 percent by weight of the initial amine charge to the system. Illustratively, the use of 50 percent excess dimethylamine in a system which produced a product with 32.7 percent by weight Mannich product in the finished polymer, resulted in a product with an estimated shelf life of over three years before producing 5 volume percent insolubles.

EXAMPLE 6

In the present example, the invention is utilized on a pilot plant scale to prepare a cationic carbamoyl polymer with a low proportion of insolubles and superior solid state stability. Aqueous polyacrylamide in the amount of 42.5 pounds was suspended in 43.7 pounds of xylene contained in a 30 gallon reactor equipped with means for providing agitation to the reaction system. The aqueous polyacrylamide contained 53% by weight polymer solids. The molecular weight of the polymer was about 1.5 million and about 0.14 percent of the original carboxamide groups had been hydrolyzed to carboxylate groups. To the resulting slurry of aqueous polymer beads was added 5.27 pounds of anhydrous dimethylamine. After stirring the amine into the system for about 10 minutes, a slurry of 3.31 pounds of paraformaldehyde and 9.7 pounds of xylene was added to the reaction system over a period of about 15 minutes. The ensuing aminomethylation of the amide groups was conducted at a temperature ranging from 30° up to 40° C. for 1.25 hours.

At this point an excess of dimethylamine in the amount of 2.76 pounds was added to the reaction system. The system was maintained for one more hour at a temperature of about 35° C. The reaction was then considered complete and about 2 pounds of a 65 percent by weight solution of methylaminoethanol in xylene was added to the reaction system. The pressure over the system was reduced to approximately 110° millimeters of mercury and its temperature increased to about 50° C. This resulted in the azeotropic distillation of water contained in the polymer along with the xylene suspending medium. During the distillation, an additional 4 pounds or so of the methylaminoethanol solution was added intermittently to replace inhibitor which had distilled. In this manner, the water content of the polymer residue was reduced to about 10 weight percent after 3 hours of distillation.

The product thus recovered was centrifuged and further dried under a vacuum. Ultimately a product was obtained containing about 5 percent by weight water.

The polymeric product was analyzed and found to contain 37.2 percent by weight Mannich reaction product and less than 0.2 volume percent of insolubles. The overall reaction efficiency based on paraformaldehyde was 84.6 percent. A portion of the product was subjected to 52° C. and the percent of insolubles measured in such product at 24 hour intervals. The product required 672 hours before exhibiting 5 volume percent insolubles. This correlates with a time period for storage at ambient room conditions, e.g. about 25° C., of over 3 years.

Essentially comparable results are achieved in the foregoing operation using reaction temperatures from about 25° to 55° C. and reaction times of 1 to 5 hours. Similarly other inert solvents such as toluene, benzene, and various liquid petroleum distillates can be used in place of xylene. Although paraformaldehyde is preferred as the source of formaldehyde, aqueous formalin or trioxymethylene can also be used.

I claim:
1. A process which comprises:
   (1) forming a liquid suspension of 1 to 70 percent by weight of an aqueous solution of a carbamoyl polymer in a water-immiscible, inert liquid, said aqueous solution containing from about 30 to about 80 percent by weight polymer solids and said carbamoyl polymer being characterized as a water-soluble polymer of monoethylenically unsaturated monomers at least 20 mole percent of which contain carbamoyl groups having the formula:

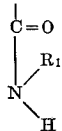

wherein $R_1$ is independently selected from the group consisting of hydrogen and alkyl hydrocarbons with 1 to 4 carbons and said water-soluble polymer containing no more than 15 percent of its mers substituted with anionic groups,
   (2) reacting the suspended carbamoyl polymer with formaldehyde and a water-soluble secondary amine of the formula

wherein $R_2$ and $R_3$ are each independently selected from the group consisting of alkyls and hydroxyalkyls having from 1 to 5 carbons and $R_2$ and $R_3$ taken together are the residue of a water-soluble, N-heterocyclic amine, said amine having a total of no more than 8 carbons,
the molar ratio of amine/formaldehyde charged being from about 1 to about 1.1 and the molar ratio of amine/formaldehyde/carbamoyl group containing in the polymer, being within the range of 0.01/0.01/1 to 1/1/1, the reaction being terminated with less than 50 mole percent of the combined carbamoyl polymers converted to the cationic amides, and thereafter separating a solid, cationic carbamoyl polymer from the reaction system.
2. A process according to claim 1 including the additional steps of extracting the reaction system after termination of the reaction with a water absorptive solvent immiscible in the reaction system to dry the cationic carbamoyl polymer and thereafter filtering said system to recover a solid, stable cationic carbamoyl polymer.
3. A process according to claim 1 including the additional step of distilling the suspension reaction system in the presence of a formaldehyde scavenger under reduced pressure at a temperature less than about 70° C. to recover a solid, stable cationic carbamoyl polymer.
4. A process according to claim 1 including the additional steps of adding to the reaction system, after carrying out the reaction for at least 30 minutes, an excess of the amine reactant up to 100 percent by weight of the amount of amine initially charged and thereafter separating a solid stable cationic carbamoyl polymer from the suspension reaction system.
5. A method as in claim 1 wherein the carbamoyl polymer is a polyacrylamide and the molar ratio of amine/formaldehyde/carbamoyl group contained in the polymer, is maintained within the range of (0.01/0.01/1) to (0.5/0.5/1.0).
6. A method as in claim 1 wherein the carbamoyl polymer is a polyacrylamide and the secondary amine is dimethylamine and the molar ratio of amine/formaldehyde/carbamoyl group contained in the polymer, is maintained within the range of (0.01/0.01/1) to (0.5/0.5/1.0).
7. A method as in claim 1 wherein the carbamoyl polymer is a polyacrylamide and the secondary amine is piperidine and the molar ratio of amine/formaldehyde/carbamoyl group contained in the polymer, is maintained within the range of (0.01/0.01/1) to (0.5/0.5/1.0).
8. A method as in claim 1 wherein the carbamoyl polymer is a polyacrylamide and the secondary amine is morpholine and the molar ratio of amine/formaldehyde/carbamoyl group contained in the polymer, is maintained within the range of (0.01/0.01/1) to (0.5/0.5/1.0).
9. A method as in claim 1 wherein the carbamoyl polymer is a polyacrylamide and the secondary amine is methylaminoethanol and the molar ratio of amine/formaldehyde/carbamoyl group contained in the polymer, is maintained within the range of (0.01/0.01/1) to (0.5/0.5/1.0).

References Cited

UNITED STATES PATENTS

| 2,328,901 | 9/1943 | Grimm et al. | 260—72 |
| 2,831,841 | 4/1958 | Jones | 260—89.7 |
| 2,976,262 | 3/1961 | Jen et al. | 260—72 |
| 3,284,393 | 11/1966 | Vanderhoff et al. | 260—89.7 |
| 3,323,979 | 6/1967 | Foster et al. | 260—72 |

WILLIAM H. SHORT, Primary Examiner

R. J. KOCH, Assistant Examiner

U.S. Cl. X.R.

260—29.6, 67.5